April 18, 1967
R. P. THORN
3,314,502
DAMPED TUBE
Filed June 16, 1965
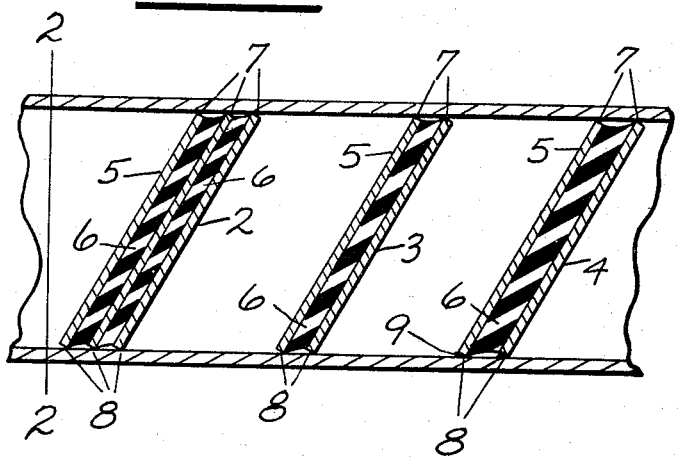
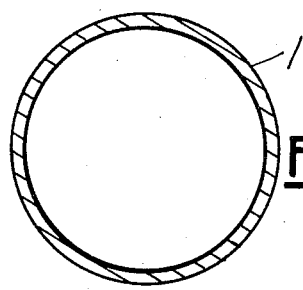
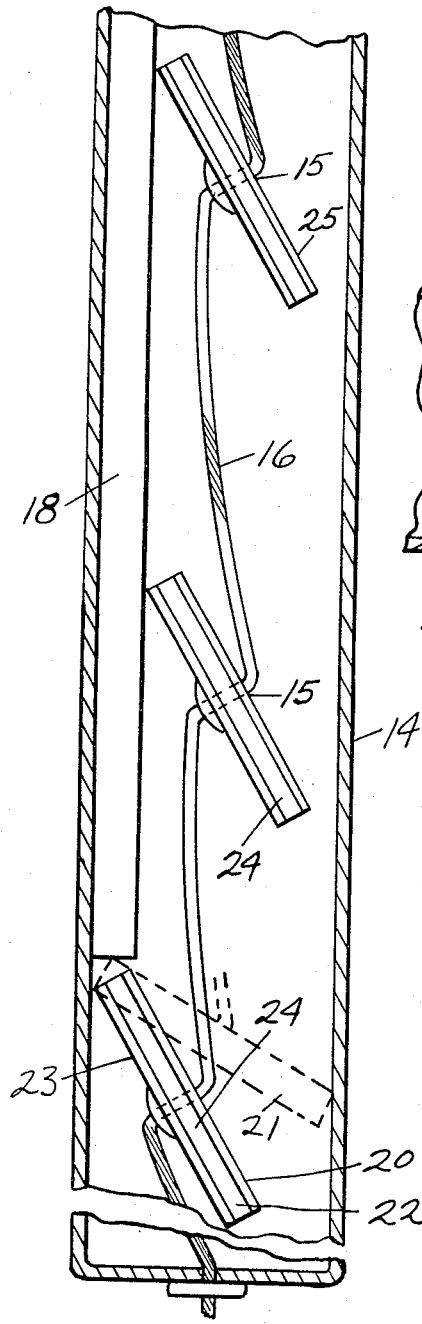
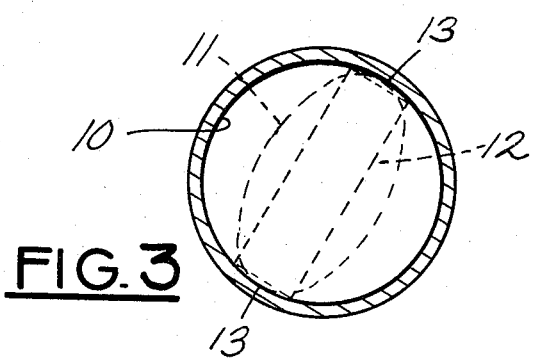
INVENTOR.
Richard P. Thorn
BY Ralph Hammar
Attorney 3,314,502
DAMPED TUBE
Richard P. Thorn, Erie, Pa., assignor to Lord Corporation, Erie, Pa., a corporation of Pennsylvania
Filed June 16, 1965, Ser. No. 464,438
5 Claims. (Cl. 188—1)

This invention is intended to increase the damping of tubular structures which are difficult to damp by externally applied damping treatments. The damping structure comprises sandwiches of viscoelastic damping and structural material extending transversely across the bore of the tube at acute angles to its axis. As the tube vibrates, the viscoelastic material is sheared between the structural material producing damping due to the high hysteresis or loss factor of the viscoelastic material.

In the drawing, FIG. 1 is a longitudinal section through a tube associated with several damping structures, FIG. 2 is a section on line 2—2 of FIG. 1, FIG. 3 is a diagrammatic view showing alternative constructions of the damping structure, and FIG. 4 is a longitudinal section showing one method of installing the damping structure.

In the drawing, the tube 1 is associated with multi-ply damping elements 2, 3 and 4, each consisting of two or more elliptical or other non circular plates 5 of structural material with layers 6 of viscoelastic material sandwiched between and bonded to adjacent structural plates. The structural material is characterized by a high modulus of elasticity and low loss factor or internal friction or hysteresis. The viscoelastic material is characterized by a low modulus of elasticity and by a high internal hysteresis or loss factor. Typically, the modulus of elasticity of the viscoelastic material is at least one order of digits less than the modulus of elasticity of the structural material and the loss factor or internal friction or hysteresis of the viscoelastic material is at least one order of digits greater than the loss factor of the structural material.

The laminates 2, 3, 4 each extends across the axis of the tube with the principal axis of the plates 5 at an acute angle to the axis of the tube and opposite edges 7, 8 of the plates are wedged across or otherwise fixed to the bore of the tube. The connection between the plates 5 and the bore of the tube may comprise viscoelastic material 9 as shown at the right in FIG. 1. Adhesives may be used. Any suitable mode of fixation may be used which will fix opposite edges of the structural plates 5 to the adjoining surfaces of the bore of the tube so that as the tube flexes, there is a slippage or shear between adjacent structural plates stressing the viscoelastic material and introducing damping. By locating the damping elements within the bore of the tube, the damping elements are totally enclosed and out of the way.

FIG. 3 illustrates diagrammatically several shapes of the damping elements. In this view, 10 indicates the bore of a tube, 11 indicates an elliptical damping element wedged across the bore of the tube, 12 indicates a rectangular damping element wedged across the bore of the tube. Since only the ends of the damping elements in contact with the bore of the tube are effective to anchor the elements, the portions intermediate the ends may be of different shape than illustrated in FIG. 3. In FIG. 3, the damping elements are shown oriented with their principal axes 13 in line with each other. The elements could be oriented with their principal axes out of line or at different angles to each other. When several elements are used in a tube, each may be differently oriented. The distribution of the damping elements along the length of the tube is in accordance with the vibration to be damped. In areas where a great deal of vibration is to be expected, the damping elements may be closely spaced while in other locations where less vibration is expected, the damping elements may be more widely spaced.

FIG. 4 shows a method of assembly of several damping elements into the bore of a tube 14. These elements have central holes which permit threading of the elements on a flexible cable or tension member 16. One end of the cable is anchored to an end cap 17 at one end of the tube 14. When no tension is applied to the cable 16, the damping elements lie relatively flat on the lower side of the tube. By inserting a bar 18 into the tube, an abutment 19 is provided so that when tension is applied to the cable 16, the damping element designated by the numeral 20 will be moved from the relatively flat full line position illustrated in FIG. 4 to the dotted line position illustrated at 21. In the 21 position, the damping element is wedged across the bore of the tube at an acute angle and in position to damp the tube by relative shearing between the plates 22, 23 of structural material and the intermediate layer 24 of viscoelastic material bonded to the plates 22 and 23. Upon reaching the wedged position, the plates may be secured in place by a suitable adhesive previously applied to the edges of the damping elements or the tension in the cable may be relied upon to maintain the damping elements wedged across the bore of the tube. The succeeding damping elements 24, 25 may be similarly moved to the erect position by retracting the bar 18 until the shoulder 19 moves past the damping element to be erected. Upon reaching this position, tension applied to the cable causes erection of the damping element engaging the shoulder 19.

At the conclusion of the assembly, the free end of the cable 16 may be secured to another end cap similar to that shown at 17 which may be tightened in place to maintain tension of the cable.

What is claimed as new is:
1. In combination with a tube, a damping element with its principal axis extending at an acute angle to the axis of the tube and fixed at opposite ends to the bore of the tube, said element comprising a layer of viscoelastic damping material sandwiched between and bonded to two plates of structural material, said viscoelastic material being characterized by an internal damping or loss factor at least one order of digits higher than the internal damping or loss factor of the structural material and a modulus of elasticity at least one order of digits lower than the modulus of elasticity of structural material.
2. The combination of claim 1 in which several damping elements are spaced along the bore of the tube with the principal axes of the plates of one damping element out of line with the principal axes of the plates of another damping element.
3. The combination of claim 1 in which the plates of the damping element are fixed to the bore of the tube by viscoelastic material.
4. The combination of claim 1 in which the ends of the plates are fixed by wedging across the bore of the tube.
5. The combination of claim 4 in which the element has a center hole and a tension member extending through the hole applies tension to the element maintaining the element wedged across the bore of the tube.

No references cited.

DUANE A. REGER, *Primary Examiner.*